Patented Sept. 7, 1926.

1,599,230

UNITED STATES PATENT OFFICE.

WALTER HAMIS GLOVER, OF BEDFORD, ENGLAND, ASSIGNOR TO COURTAULDS LIMITED, OF LONDON, ENGLAND.

MANUFACTURE AND PRODUCTION OF THREADS, FILAMENTS, STRIPS, OR FILMS FROM CELLULOSE ETHERS.

No Drawing. Application filed November 17, 1924, Serial No. 750,478, and in Great Britain January 5, 1924.

This invention consists in an improved process for precipitating, or coagulating, cellulose ethers from solutions thereof in a suitable volatile solvent, or suitable volatile solvents, for the making of threads, filaments, strips, or films.

According to this invention a solution of a cellulose ether (such, for example, as cellulose ethyl-ether) in a suitable solvent, or mixture of suitable solvents, is projected through suitably shaped orifices, or is otherwise introduced, into a saponifiable animal, or vegetable, oil such, for example, as castor oil, linseed oil, or cod-liver oil, or a mixture of such oils. On so proceeding the cellulose ether is rapidly precipitated and afterwards can be freed from any excess of oil in any suitable manner. In this way artificial silk, threads, or filaments, of good quality can be spun, and films, or strips, of great pliability and freedom from blemishes can be obtained.

The ether may be dissolved in any suitable solvent, or mixture of suitable solvents, which is, or are, miscible with the oil, or oils, used for precipitating, and this solvent, or these solvents, can be readily recovered from the oil, or oils, by distillation, or by any other suitable means.

Any appropriate solvent or mixture of solvents, of which many are well known in the art, may be used—e. g., chloroform or a mixture of benzene and ethyl alcohol.

What I claim is:—

1. In the manufacture of cellulosic products, the step of introducing a cellulose ether solution into a setting bath comprising a saponifiable oil to effect the precipitation of the cellulose ether.

2. In the manufacture of cellulosic products, the step of introducing a cellulose ether solution into a setting bath comprising a saponifiable oil to effect the precipitation of cellulose ether, and thereafter freeing the product of excess oil.

3. In the manufacture of cellulosic products, the step of introducing a cellulose ether solution into a setting bath comprising a saponifiable oil to effect the precipitation of cellulose ether, and thereafter recovering the solvent from the setting bath.

4. The method of producing cellulose ether products which comprises dissolving the same in a solvent miscible with a saponifiable oil, and thereafter projecting the solution into a setting bath comprising a saponifiable oil capable of absorbing the solvent from the injected stream of cellulose ether solution.

In testimony whereof I have signed my name to this specification.

WALTER HAMIS GLOVER.